United States Patent [19]
O'Bannon et al.

[11] Patent Number: 6,131,436
[45] Date of Patent: Oct. 17, 2000

[54] METHOD AND SYSTEM FOR WEAR TESTING A SEAT BY SIMULATING HUMAN SEATING ACTIVITY AND ROBOTIC HUMAN BODY SIMULATOR FOR USE THEREIN

[75] Inventors: Terry O'Bannon, Royal Oak; Robert A. Stewart, South Lyon, both of Mich.

[73] Assignee: Lear Corporation, Southfield, Mich.

[21] Appl. No.: 09/259,829

[22] Filed: Mar. 1, 1999

[51] Int. Cl.[7] .................................................. G01M 19/00
[52] U.S. Cl. ................................ 73/7; 73/866.4; 73/865.6
[58] Field of Search ........................... 73/865.6, 7, 866.4

[56] References Cited

U.S. PATENT DOCUMENTS

| | | |
|---|---|---|
| 2,670,627 | 3/1954 | Shaw . |
| 3,501,777 | 3/1970 | Degtyarev et al. . |
| 3,592,041 | 7/1971 | Spencer . |
| 3,841,163 | 10/1974 | Daniel ..................................... 73/866.4 |
| 4,254,433 | 3/1981 | Dewar, Jr. et al. . |
| 4,261,113 | 4/1981 | Alderson . |
| 4,320,392 | 3/1982 | Giovinazzo et al. . |
| 4,375,674 | 3/1983 | Thornton . |
| 4,409,835 | 10/1983 | Daniel et al. . |
| 4,438,650 | 3/1984 | Meek . |
| 4,539,585 | 9/1985 | Spackova et al. . |
| 4,701,132 | 10/1987 | Groesch et al. . |
| 4,873,867 | 10/1989 | McPherson et al. . |
| 5,116,381 | 5/1992 | Palfray . |
| 5,232,243 | 8/1993 | Blackburn et al. . |
| 5,336,270 | 8/1994 | Lloyd . |
| 5,373,749 | 12/1994 | Strand et al. . |
| 5,376,127 | 12/1994 | Swanson . |
| 5,379,646 | 1/1995 | Andrzejak et al. . |
| 5,394,766 | 3/1995 | Johnson et al. . |
| 5,474,327 | 12/1995 | Schousek . |
| 5,526,707 | 6/1996 | Smrcka . |
| 5,628,230 | 5/1997 | Flam ...................................... 73/866.4 |
| 5,641,917 | 6/1997 | Hurite et al. ........................... 73/865.6 |
| 5,703,303 | 12/1997 | Stewart . |

FOREIGN PATENT DOCUMENTS

| | | | |
|---|---|---|---|
| 2358716 | 2/1978 | France ................................. 73/866.4 |

OTHER PUBLICATIONS

U.S. application No. 08/730,897.

*Primary Examiner*—Hezron Williams
*Assistant Examiner*—Nashmiya Fayyaz
*Attorney, Agent, or Firm*—Brooks & Kushman P.C.

[57] ABSTRACT

A method and system for wear testing a seat by simulating human seating movement are disclosed wherein load distributions and histories experienced by the seat are more accurately simulated. The system utilizes a robot and a robotic human body simulator including a pelvic girdle mounted at a distal end of an arm thereof wherein a seat back surface as well as a seat bottom surface are wear tested. The simulator includes a plurality of drives which receive drive control signals from a robot controller for moving a thoracic cage and femurs of the simulator relative to and independent of one another and the pelvic girdle to test wear characteristics of the seat bottom surface and the seat back surface of the seat under test for a plurality of cycles.

20 Claims, 3 Drawing Sheets

METHOD AND SYSTEM FOR WEAR TESTING A SEAT BY SIMULATING HUMAN SEATING ACTIVITY AND ROBOTIC HUMAN BODY SIMULATOR FOR USE THEREIN

CROSS-REFERENCE TO RELATED APPLICATIONS

This application is related to the following U.S. patent applications filed on the same date as this application and entitled "Vibration Dummy Apparatus" and "A Biofidelic Human Seating Surrogate Apparatus."

TECHNICAL FIELD

This invention relates to methods and systems for wear testing parts and, in particular, to methods and systems for wear testing seats such as automotive seats by simulating human seating activity and a robotic human body simulator for use therein.

BACKGROUND ART

Durability tests performed by apparatus such as sliding entry machines or other chair testing apparatus are common. For example, the U.S. patent to Spencer, U.S. Pat. No. 3,592,041, discloses a chair testing apparatus for testing the durability and wear characteristics of a chair. The test apparatus includes a number of weight pads that engages a seat bottom portion and a seat back portion of the chair in a continuous cycling motion.

The U.S. patent to Shaw, U.S. Pat. No. 2,670,627 discloses an apparatus for testing the resistance of textile fabric to abrasion, flexing and creasing.

The U.S. patent to Strand et al., U.S. Pat. No. 5,373,749, discloses a tester for applying forces to a back portion of a vehicle seat.

The U.S. patent to Andrzejak, U.S. Pat. No. 5,379,646 discloses a robotic seat back load-applying device that is capable of applying static and control loading along various points of an automobile seat back.

U.S. patent application entitled "Method and System for Creating a Time-Lapse Record of Wearout of a Part" filed on Oct. 18, 1996 and having U.S. Ser. No. 08/730,897 now abandoned describes a system for durability simulations based upon gross movement of the occupant's buttocks on a seat to be tested. Consequently, the system incompletely represent the human interface to such seats.

Some multi-axis systems rely upon a programmer's expertise in the translation of video images for machine programming of the systems. Such systems also have no feedback loop with which to verify proper simulator loading of the seat.

U.S. Pat. No. 3,841,163 discloses a test dummy indicating system.

U.S. Pat. Nos. 4,873,867; 4,701,132; 4,409,835 and 4,261,113 disclose test dummies that represent the back, buttocks and legs of the human body.

U.S. Pat. No. 4,438,650 discloses a test mannequin which is shaped to correspond to the upper legs, buttocks, and back of a human.

The U.S. patent to Johnson et al., U.S. Pat. No. 5,394,766, discloses a plastic human torso that simulates the size, appearance, and movement of a human torso.

U.S. Pat. No. 5,336,270 discloses a plastic material formed over inner components.

U.S. Pat. No. 3,501,777 discloses a urethane foam disposed over a simulated skeleton.

U.S. Pat. No. 5,376,127 discloses polyethylene sheet material surrounding a endoskeleton.

U.S. Pat. No. 5,166,381 discloses a lower leg cast of thermoplastic material.

U.S. Pat. No. 5,526,707 discloses a simulated pregnant crash test dummy.

U.S. Pat. No. 5,703,303 discloses a simulator for testing seats, with the simulator being mounted on a boom. In particular, the simulator includes a trunk having buttocks and a back hingedly connected thereto so that the back can move independently of the buttocks during extension and retraction of an electric actuator or drive. The drive takes the form of a cylinder, one end of which is pivotally connected to an inner surface of the back. The simulator also includes upper legs or thighs which are pivotally connected to the buttocks by means of ball joints. Each of the thighs is also controllably driven by its own respective electric drive or actuator in the same fashion as the actuator drives the back.

The forces and torques encountered by a robot arm can be measured directly by using a wrist force sensor, which basically consists of a structure with some compliant sections and transducers that measure the deflections of the compliant sections. The most common transducer used for this purpose is the strain gage, others being piezoelectric, magnetostrictive, magnetic, and so on. For example, the U.S. patent to Giovinazzo et al., U.S. Pat. No. 4,320,392, discloses a transducer which has six degrees of freedom and is arranged to output electrical signals indicative of the forces and movements applied thereto.

Forces and torques can also be sensed indirectly by measuring the forces acting on the joints of a manipulator. For joints driven by DC electric motors, the force is directly proportional to the armature current; for joints driven by hydraulic motors, it is proportional to back pressure.

Some scientific studies of human movement have relied on markers affixed to the body of the subject. These markers can then be tracked over time to reveal the patterns of movement of various parts of the body.

Marking points of interest such as the joints of the body is only the first step in analyzing human movement. Before any analysis can occur, the markers must be detected and their position measured. Such measurement can be tedious and time-consuming. For example, athletes participating in early film studies of human motion wore X's on their joints while throwing a football or carrying out some other athletic task. Researchers then went through the films frame by frame, digitizing the positions of the X markers to get the data required to analyze force, acceleration, and so on.

The measurement of marker position has been automated in various ways. One example is the approach described in the U.S. patent to Thornton, U.S. Pat. No. 4,375,674. Thornton's kinesimetric apparatus relies upon one or more incandescent lamps affixed to the subject's body as markers. The 3-D position of each marker is determined through triangulation, given the output signals of a number of video cameras focused on the subject. This makes it possible to build up a movement envelope over time for each marker.

The use of marker shape to provide 3-D information without triangulation or multiple sensors is proposed by the U.S. patent to Spackova et al., U.S. Pat. No. 4,539,585. An equilateral triangle is affixed to a subject who is to be photographed by a video camera. As the subject turns from side-to-side, the apparent shape of the triangle will change. A computer determines orientation from the amount of changes.

What all of these approaches have in common is the use of markers or signal sources which are worn or held by the person whose movements are being measured.

A number of other devices exist which rely on a human operator to identify features of interest after the fact. In such a system, the subject wears no markers while his or her image is being recorded. Instead, an operator marks the specified features by using a light pen or similar device.

The U.S. patent to Dewar, Jr. et al., U.S. Pat. No. 4,254,433, discloses a visual motion tracking system wherein movement of an article is monitored by providing a patterned target to move with the object. A solid state line scan camera views the pattern of the target as it moves relative to the camera and the electronic output of the camera representing the light and dark areas of the target is analyzed by an electronic circuit to determine the movement of the target and therefore of the object being monitored. The resulting electronic signal representing the motion of the object is useful for coordinating the movement of a robot which is operating upon the object during its movement.

Qualisys, Inc. of Glastonbury, Conn. sells a kinematic measurement product called a PC Reflex 3D 60 Motion Measurements System. The system is designed to measure the motion of subjects in real-time and produce both qualitative and quantitative results within a matter of seconds. The system includes the following components:

1. Multiple position sensors (camera systems) each of which includes a specially designed video camera and a specially designed video processor.
2. Software which enables the user to set up a desired field of view of the position sensors, calibrate the desired field of view, and process in real-time the measured spatial coordinates (x,y) of target markers which are attached to a subject in the calibrated field of view.
3. Passive reflective target markers—come in various sizes and shapes. Standard Scotchlite 3M™ reflective paint can also be used.
4. A calibration frame which is used so that the volume of the desired field of view can be calibrated using software calibration routines.

Seat force sensors embedded within a seat to obtain electrical signals representative of force or weight experienced at various locations on the seat are well known. For example, the U.S. patent to Blackburn et al., U.S. Pat. No. 5,232,243, discloses film-like occupant position and weight sensors.

The U.S. patent to Schousek, U.S. Pat. No. 5,474,327, discloses a seat pressure sensor comprising eight variable resistance pressure sensors embedded in a seat cushion. The response of each sensor to occupant pressure is monitored by a microprocessor which calculates total weight and weight distribution.

DISCLOSURE OF INVENTION

An object of the present invention is to provide a method and system for wear testing a seat by more accurately simulating load distributions and histories caused by human seating activity not only on a seat bottom, but also on a seat back of the seat during simulated vehicle ingress/egress.

Another object of the present invention is to provide a method and system for wear testing a seat utilizing a robotic human body simulator which more accurately simulates load distributions and histories caused by upper leg (thigh), buttock and back interaction with the seat under test.

In carrying out the above objects and other objects of the present invention, a method is provided for wear testing a seat by simulating human seating activity. The method includes the step of providing a robot, including an arm with a robotic body simulator connected at a distal end thereof. The simulator includes a substantially geometrically-correct, relatively hard and relatively stiff skeletal frame structure having a thoracic cage, a pair of scapulae connected at opposite sides of the thoracic cage, a set of lumbar vertebrae connected to the thoracic cage, a pelvic girdle connected to the lumbar vertebrae, a coccyx connected to the pelvic girdle, a pair of femurs and a first pair of ball-and-socket joints for connecting their respective femur to the pelvic girdle. The simulator further includes elastomeric plastic formed over the skeletal frame structure. The elastomeric plastic has a substantially anatomically-correct, surface geometry. At least the elastomeric plastic formed over the pelvic girdle, the coccyx and the pair of femurs has mechanical properties of bulk muscular tissue in a state of moderate contraction. The method also includes the step of repeatedly driving the robot arm and the thoracic cage and femurs relative to and independent of one another between a withdrawn position and a plurality of seat-surface engaging positions to test wear characteristics of a seat bottom surface and a seat back surface for a plurality of cycles.

Preferably, the method also includes the step of generating signals indicative of forces applied to the simulator during the step of repeatedly driving.

Further in carrying out the above objects and other objects of the present invention, a system is provided for wear testing a seat by simulating human seating activity. The system includes a robot including an arm having a distal end and at least one arm drive for moving the arm and a robotic human body simulator connected to the distal end of the arm for wear testing a seat bottom surface and a seat back surface of the seat under test. The simulator includes a substantially geometrically-correct, relatively hard and relatively stiff skeletal frame structure having a thoracic cage, a pair of scapulae connected at opposite sides of the thoracic cage, a set of lumbar vertebrae connected to the thoracic cage, a pelvic girdle connected to the lumbar vertebrae, a coccyx connected to the pelvic girdle, a pair of femurs and a first pair of ball-and-socket joints for connecting their respective femurs to the pelvic girdle. The simulator also includes elastomeric plastic formed over the skeletal frame structure. The elastomeric plastic having a substantially anatomically-correct, surface geometry. At least the elastomeric plastic formed over the pelvic girdle, the coccyx and the pair of femurs has mechanical properties of bulk muscular tissue in a state of moderate contraction. The simulator also includes a plurality of simulator drives adapted to receive drive control signals for moving the thoracic cage and femurs relative to and independent of one another to test wear characteristics of a seat bottom surface and a seat back surface for a plurality of cycles. The system also includes a controller coupled to the at least one arm drive and the plurality of simulator drives and programmed with a control program to generate drive control signals so that the at least one arm drive and the plurality of simulator drives independently move the arm and the thoracic cage and femurs of the simulator, respectively, repeatedly between a withdrawn position and a plurality of seat surface engaging positions to test wear characteristics of the seat bottom surface and the seat back surface for a plurality of cycles.

Preferably, the system further includes a force measuring device coupled to the controller to generate signals indicative of forces applied to the simulator during the wear testing. The force measuring device is a transducer coupled to the simulator at the distal end of the arm. Preferably, the transducer is a load cell which has six degrees of freedom.

Yet, still further in carrying out the above objects and other objects of the present invention, a robotic human body simulator is provided for wear testing a seat. The robotic human body simulator is adapted to be attached as an end effector of a robot. The simulator includes a substantially geometrically-correct, relatively hard and relatively stiff skeletal frame structure having a thoracic cage, a pair of scapulae connected at opposite sides of the thoracic cage, a set of lumbar vertebrae connected to the thoracic cage, a pelvic girdle connected to the lumbar vertebrae, a coccyx connected to the pelvic girdle, a pair of femurs and a first pair of ball-and-socket joints for connecting their respective femurs to the pelvic girdle. The simulator also includes elastomeric plastic formed over the skeletal frame structure. The elastomeric plastic has a substantially anatomically-correct, surface geometry. At least the elastomeric plastic formed over the pelvic girdle, the coccyx and the pair of femurs has mechanical properties of bulk muscular tissue in a state of moderate contraction. The simulator further includes a plurality of simulator drives adapted to receive drive control signals for moving the thoracic cage and femurs relative to and independent of one another to test wear characteristics of a seat bottom surface and a seat back surface for a plurality of cycles.

Preferably, at least one of the plurality of drives moves the thoracic cage relative to and independent of the pelvic girdle. The skeletal frame structure further includes a pair of flexible couplings for allowing relative rotary and translational motion between the thoracic cage and the set of lumbar vertebrae and between the set of lumbar vertebrae and the pelvic girdle.

Also, preferably, each of the femurs is moved by at least one of the plurality of drives relative to and independent of the pelvic girdle. Each of the femurs is moved by two of the plurality of drives relative to and independent of pelvic girdle.

Preferably, the thoracic cage includes a set of thoracic vertebrae, a sternum and a set of ribs interconnecting the thoracic vertebrae and the sternum.

Also, preferably, the pelvic girdle includes a set of sacrum vertebrae and a pair of coxae connected to the set of sacrum vertebrae. The first pair of ball-and-socket joints connect their respective femurs to their respective coxae.

Preferably, the plastic formed over the pelvic girdle, the coccyx and the pair of femurs has an effective stiffness in a range of 6 to 140 kPa. The elastomeric plastic may be a castable urethane elastomer molded over the skeletal frame structure. The mechanical properties include stiffness and damping.

Also, preferably, the elastomeric plastic is completely formed over the skeletal frame structure and at least a part of the skeletal frame structure is made from plastic.

Preferably, each of the drives includes a linear actuator and a servo motor for driving the linear actuator.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
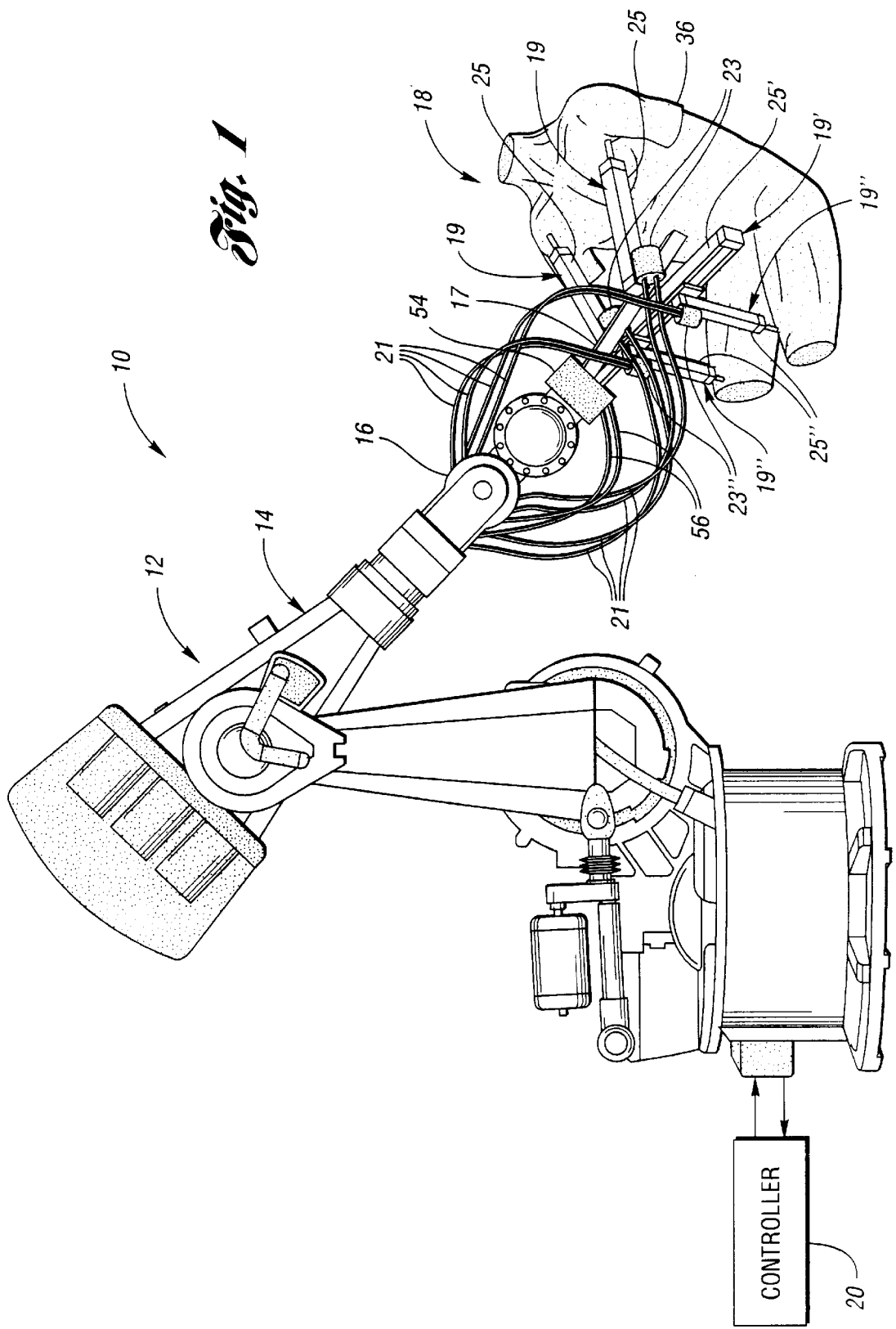
FIG. 1 is a schematic diagram illustrating a system including a robot, its controller and a robotic human body simulator, mounted at a distal end of the robot's arm and constructed in accordance with the present invention.

Referring now to the drawing Figures, there is illustrated in FIG. 1 a system, generally indicated at 10, for wear testing a seat by simulating human seating activity. The system 10 preferably includes a multi-axis electric robot, generally indicated at 12, including an arm, generally indicated at 14. Preferably, the robot 12 is a Kuka KR200 six-axis robot. At a distal end 16 of the arm 14, there is mounted by a connector 17 an end effector in the form of a robotic human body simulator, generally indicated at 18, for wear testing a seat bottom surface and a seat back surface of an automotive seat.

The system 10 also includes a conventional robot controller 20 which is capable of handling 12 axes simultaneously and which is electrically coupled to electric servo motor linear drives, generally indicated at 19, 19' and 19" of the simulator 18 by cables 21. Each of the drives 19, 19' and 19" includes a conventional servo motor electrically connected to its respective cables 21 and in driving engagement with a linear actuator in the form of a screw drive (not shown) within its respective housing. Such linear actuators are available from Parker Hannifin Corp. of Rohnert Park, Calif.

Servo motors 23 and 23" and housings 25 and 25" are shown for the drives 19 and 19", respectively. However, for purposes of simplicity, only a common housing 25' of the drives 19' without their motors as well as their cables is illustrated. The housings 25 and 25' are fixedly connected to and are supported by the connector 17 to move therewith. In turn, the drives 19" are supported on the common housing 25' to move therewith. However, it is to be understood that the motors of the drives 19' are coupled to the drives 19" through their screw drives to linearly move the drives 19" either toward or away from each other to simulate movement of thighs 27 of the simulator 18 toward or away from each other, respectively.

The controller 20 is preferably a Kuka KRC1 controller. The robot controller 20 is programmed with a control program to generate drive control signals for use by electric servo motor drives (not shown) of the robot 12 and the electric servo motor drives 19, 19' and 19" of the simulator 18 so that the drives of the robot arm 14 and the simulator drives 19, 19' and 19" independently move the arm 14 and the simulator 18, respectively, repeatedly between a withdrawn position and seat surface engaging positions to test wear characteristics of the seat bottom surface and the seat back surface for a plurality of cycles.

Figure 2:
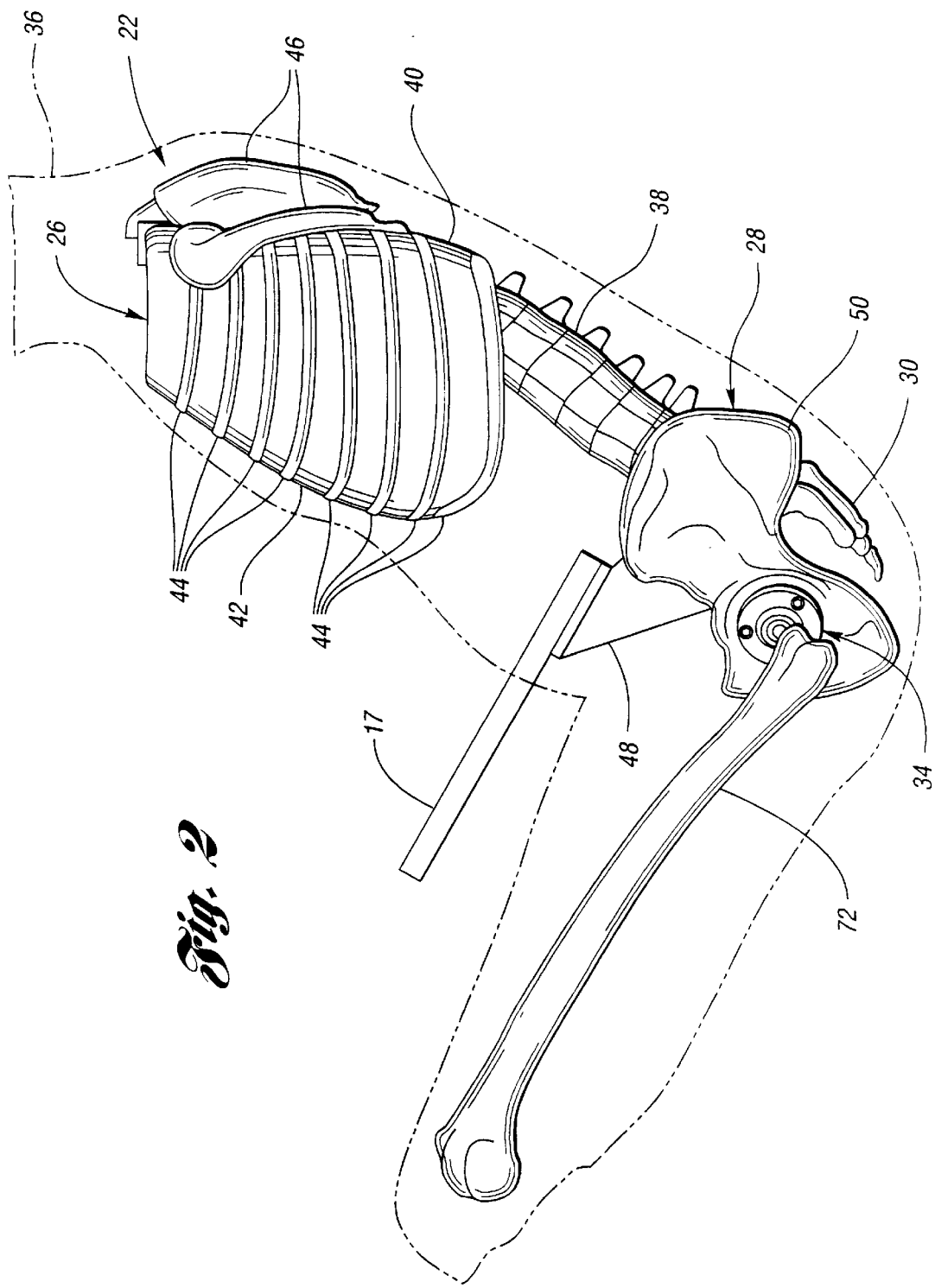
FIG. 2 is an enlarged view of the robotic human body simulator with an elastomeric plastic "soft tissue" layer indicated by phantom lines.
Figure 3:
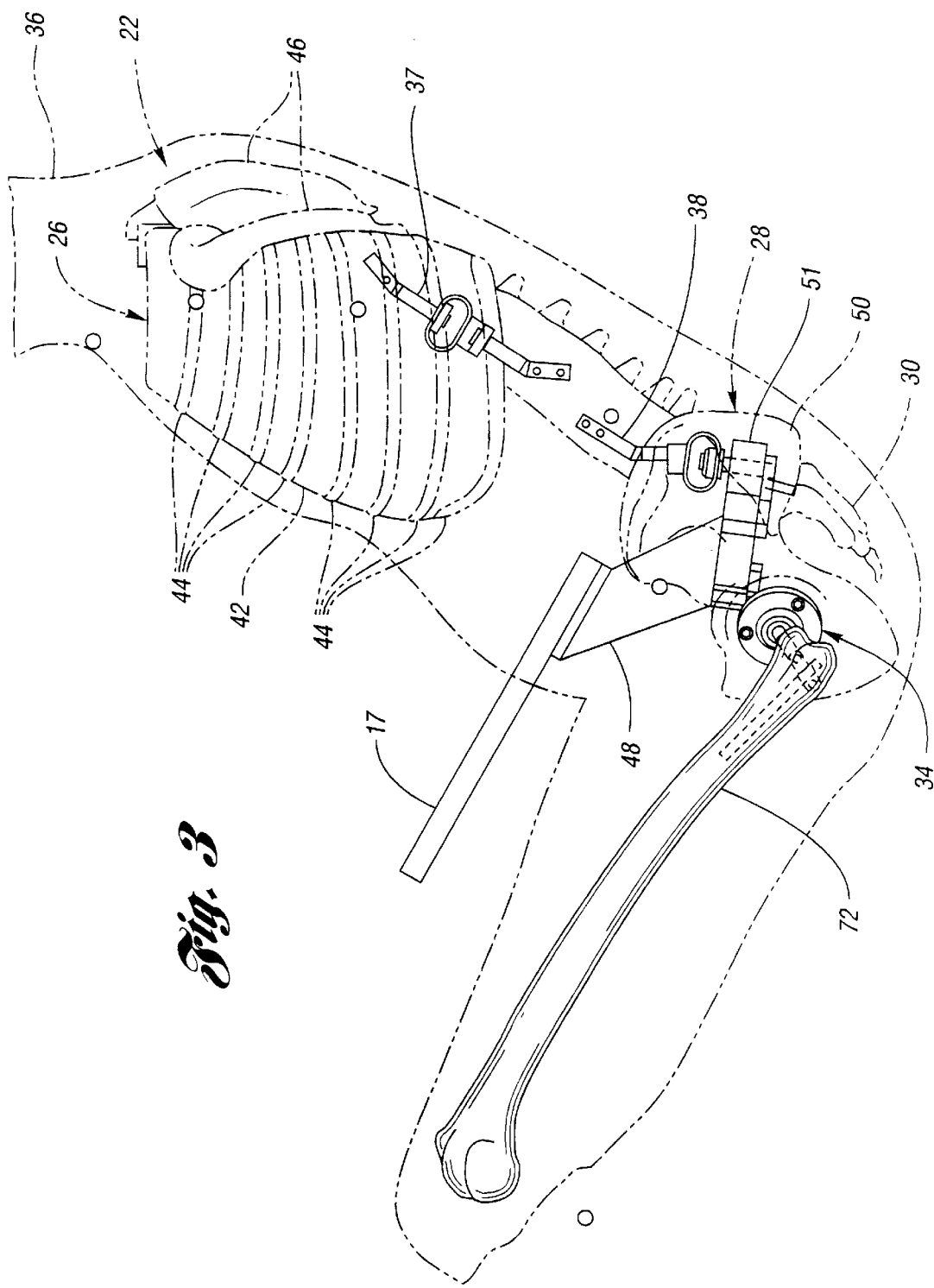
FIG. 3 is a view similar to FIG. 2 with various simulated bones indicated by phantom lines to illustrate various joints of the skeletal frame structure of the simulator.

In particular, the simulator 18 includes a substantially geometrically-correct, relatively hard and relatively stiff skeletal frame structure, generally indicated at 22 in FIGS. 2 and 3. The structure 22 includes a thoracic cage, generally indicated at 24, a set of lumbar vertebrae 26 connected to the thoracic cage 24, a pelvic girdle, generally indicated at 28, connected to the lumbar vertebrae 26, a coccyx 30 connected to the pelvic girdle 28, a pair of femurs 32 (only one shown) and a pair of ball-and-socket joints, generally indicated at 34 (only one shown), for connecting their respective femurs 32 to the pelvic girdle 28.

The simulator 18 also includes elastomeric plastic 36 formed over the skeletal frame structure 22. The elastomeric plastic 36 has a substantially anatomically-correct, surface geometry. At least the elastomeric plastic 36 formed over the pelvic girdle 28, the coccyx 30 and the pair of femurs 32 has mechanical properties of bulk muscular tissue in a state of moderate contraction. The mechanical properties of the plastic 36 include stiffness and damping. The robot 12 may provide much of the inertia of the simulator 18.

The plastic 36 formed over the pelvic girdle 28, the coccyx 30 and the pair of femurs 32 has an effective stiffness in a range of 6 to 140 kPa. The elastomeric plastic 36 may be a castable urethane elastomer known as "Skinflex III". The plastic 36 is made from Skinflex III components by mixing 300 grams of Skinflex III Part "A" into 600 grams of Skinflex Part "B" and then mixing in approximately 1200 grams of Skinflex III Part "C" which is a plasticizer. These components are available from Chembar, Inc. of Groveport, Ohio.

The simulator drives 19 are connected at opposite sides of the thoracic cage 24 to move the thoracic cage 24. The simulator drives 19" are connected to the femurs 32 to move the femurs 32 relative to and independent of one another to test wear characteristics of a seat bottom surface and a seat back surface for a plurality of cycles. In particular, the simulator drives 19 may rotate and translate the thoracic cage 24 and the set of lumbar vertebrae 26 relative to and independent of the pelvic girdle 28 through a pair of flexible couplings 37 and 38 as shown in FIG. 3. The couplings 37 and 38 are available from the Acushnet Company of Massachusetts and are generally of the type illustrated in U.S. Pat. No. 3,224,224.

Also, each of the femurs 32 is moved by two of the simulator drives 19' and 19" relative to and independent of the pelvic girdle 28. The ball-and-socket joints 34 permit relative movement of the femurs 32 with respect to the pelvic girdle 28.

The first and second flexible couplings 37 and 38 allows relative rotary and translational motion between the thoracic cage 24 and the set of lumbar vertebrae 26 and between the lumbar vertebrae 26 and the pelvic girdle 28. The couplings 37 and 38 act as constrained ball joints.

The thoracic cage 24 includes a set of thoracic vertebrae 40, a sternum 42 and a set of interconnected ribs 44 which, in turn, interconnect the thoracic vertebrae 40 and the sternum 42. As illustrated in FIGS. 2 and 3, the thoracic cage 24 may be formed as an integrated unit.

The simulator 18 further includes a pair of scapulae 46 connected at opposite sides of the thoracic cage 24.

The pelvic girdle 28 includes a set of sacrum vertebrae (not shown) and a pair of coxae 50 connected to the set of sacrum vertebrae 10. The connector 17 is fixedly connected to the pelvic girdle 28 by means of a plate 48 and a metal pipe 51. One end of the flexible coupling 38 is connected to the pipe 51.

The pair of ball-and-socket joints 34 connect their respective femurs 32 to their respective coxae 50.

Preferably, all joints of the simulator 18 are biofidelic in their kinematics, meaning the joints 34 at the hips, and the couplings 37 and 38 provide prescribed motions at the T12/L1 (the 12th thoracic vertebrae-first lumbar vertebrae) and the L5/S1 (fifth lumbar vertebrae-first sacrum vertebrae) interfaces with joints of differing stiffness to favor L5/S1 compliance. The primary load of the simulator 18 is carried from the pelvic girdle 28. The thighs and the back of the simulator 18, in turn, are moved relative to the pelvis reference frame.

Kinematic and Loading Data Collection

The controller 20 of the system 10 is designed to take kinematic data collected from human motion studies to create a computer program, and then use loading data collected at the same time to refine the computer program and ensure that exact human loading is reproduced. Kinematic data is collected by means of Qualisys infrared cameras/motion capture units mated to PC Reflex collection and tracking software. These cameras record the 3-D coordinates of reflective markers as they move through space at 60 Hz. The markers are attached to known bony prominences, or landmarks, of the subjects, and they execute the desired motion.

For the system 10, one calculates the 6-DOF trajectory of the pelvis girdle 28 as a rigid body (which requires a minimum of three markers per segment), and then calculates the space angles of the thigh and torso rotations relative to that coordinate system. This kinematic information is used directly as the basis for the path of the robot 12, since the robot tool center point is defined as the hip joint center (H-Point), and the thigh and torso moves are defined kinematically from that point.

The load distribution history is also important to replicate the human use of the seat, and, in fact, is the final reference standard for durability testing. The load histories are collected using a pressure distribution mat collecting at least at Nyquist frequency, which for smooth (i.e., non-impact) human motions is generally taken to be around 16 Hz. The number of data points can be enormous, even using a coarse 16×16 grid (two pads=512 points every sample), so there is no direct way to use this information to refine whatever load errors are introduced by using a purely visual system, but there are indirect methods.

Robot Programming

The robot controller 20 is based on a standard Pentium chip and motherboard. The system partitions the memory to use Windows for all interface and file systems and VxWorks as a real-time operating system for controlling the robot servo-drives, and thereby the robot 12. The robot 12 achieves a great deal of precision by using highly accurate electrical and mechanical models of the robot 12 to pre-calculate the estimated current necessary to drive the robot 12 along a specified trajectory. This estimator model is then used in conjunction with resolver feedback for closed-loop motions. These path trajectories are planned at 83.33 Hz, so the robot 12 is well able to achieve the necessary precision for human motion simulations.

Additionally, there is another useful feature available with the controller 20, known as the SoftServo function, which allows the robot 12 to maintain a given torque output from a motor regardless of position, allowing it to compensate for environment compliance.

In the system 10, the additional six motor drives 19, 19' and 19" may be Hauser drives which, together with attachment hardware and even the dummy kinematics and dynamics, are integrated into the internal model of the robot 12. This is possible because all of the components may be created with CAD files, and a KR-Sim package of KUKA may validate the design before production. A translator algorithm may be used to convert the resulting kinematic data directly into the robot coordinate system, so no manual file manipulation is needed.

Another part of this system 10 is a Theta load cell 54 from ATI Industrial Automation coupled to the controller 20 via cables 56 which extend through the robot 12. A controller for this load cell 54 may be adapted to an ISA bus card that one is able to put directly into the Pentium-based robot controller 20. This allows for six-axis load data to be directly available to the robot operating system literally in real-time. The load cell 54 is placed directly in line with the rigidly attached pelvis girdle 28 at the connector 17.

Once a given robot path is created, the information from the load cell 54 can be used alone or in conjunction with the SoftServo function to maintain a distinct load at each point of the trajectory. Because of the cyclic nature of durability testing, the option exists of compensating/correcting points immediately, halting execution of a cycle, or projecting the proper compensation and instituting it on the next cycle.

When used for seat testing, the robot 12 is ideal because it can ensure that the same exact motion is produced on every sample, regardless of the sample's physical location. The robot 12 can reference all motions relative to a seating position such as H-point, so one need only to identify that position to the robot 12 to guarantee that the path will be identical from one seat to the next.

Load Training

The cyclical nature of a test is used to advantage to transform the kinematically correct paths into dynamically correct paths. A seat in question can be configured with a pressure mat in the same location as when the human subject performed the motions, and the robot 12 can execute the kinematically correct path for a few cycles. This pressure distribution data collected during this time can be analyzed and compared with the human data, and an appropriate offset for each axis at every point in the trajectory can be computed.

There is no mathematically exact way of doing this, but it is possible to use neural net techniques to do so. The development of the system 10 calls for the robot 12 to undergo many different paths with a reference seat that is instrumented with the pressure mat to create a training set of data. A recursive back-propagation routine may use the model of the system 10 as a basis to develop a neural net model of how various changes in the trajectory lead to different pressure distribution history. This neural net model then becomes the basis for a teaching mode with new seats.

It is envisioned that the robot 12 can continue cycling while it takes the pressure distribution data off-line for analysis by the neural net model. The neural net model suggests an offset file for the trajectory and this is implemented on subsequent cycles. The comparison is then made again, and the neural net model updates itself to the new data it has learned through the new error file, and this iterates until a certain tolerance of fit is achieved.

When this fit is achieved, the output of the load cell 54 through the cycle is memorized as a standard. At this point, the pressure mat is removed and the load compensation strategies utilizing the load cell 54 and the SoftServo function are enabled to maintain the load history.

The system 10 replicates the motion and load histories of human subjects interacting with an automotive seat. The system 10 measures the kinematics and load application of the subject, reproduces the motion by means of the six axis robot 12 in combination with the six axes of the drives 19, 19' and 19" and uses indirect load feedback to teach the load history to the robot 12, and the direct load feedback from the load cell 54 to maintain that history throughout the cycles of a durability test. The system 10 is much more predictive of durability, because it provides the precise loads to the precise locations with the precise timing that humans produce in field use.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for wear testing a seat by simulating human seating activity, the method comprising the steps of:

providing a robot, including an arm with a robotic human body simulator connected at a distal end thereof; the simulator including a substantially geometrically-correct, relatively hard and relatively stiff skeletal frame structure having a thoracic cage, a pair of scapulae connected at opposite sides of the thoracic cage, a set of lumbar vertebrae connected to the thoracic cage, a pelvic girdle connected to the lumbar vertebrae, a coccyx connected to the pelvic girdle, a pair of femurs and a pair of ball-and-socket joints for connecting respective femur to the pelvic girdle; the simulator further including elastomeric plastic formed over the skeletal frame structure, the elastomeric plastic having a substantially anatomically-correct, surface geometry, and wherein at least the elastomeric plastic formed over the pelvic girdle, the coccyx and the pair of femurs has mechanical properties of bulk muscular tissue in a state of moderate contraction; and repeatedly driving the robot arm and the thoracic cage and femurs relative to and independent of one another between a withdrawn position and a plurality of seat-surface engaging positions to test wear characteristics of a seat bottom surface and a seat back surface of the seat under test for a plurality of cycles.

2. The method as claimed in claim 1 further comprising the step of:

generating signals indicative of forces applied to the simulator during the step of repeatedly driving.

3. A system for wear testing a seat by simulating human seating activity, the system comprising:

a robot including an arm having a distal end and at least one arm drive for moving the arm;

a robotic human body simulator connected to the distal end of the arm for wear testing a seat bottom surface and a seat back surface of the seat under test, the simulator including:

a substantially geometrically-correct, relatively hard and relatively stiff skeletal frame structure having a thoracic cage, a pair of scapulae connected at opposite sides of the thoracic cage, a set of lumbar vertebrae connected to the thoracic cage, a pelvic girdle connected to the lumbar vertebrae, a coccyx connected to the pelvic girdle, a pair of femurs and a pair of ball-and-socket joints for connecting respective femurs to the pelvic girdle;

elastomeric plastic formed over the skeletal frame structure, the elastomeric plastic having a substantially anatomically-correct, surface geometry, and wherein at least the elastomeric plastic formed over the pelvic girdle, the coccyx and the pair of femurs has mechanical properties of bulk muscular tissue in a state of moderate contraction; and a plurality of simulator drives adapted to receive drive control signals for moving the thoracic cage and femurs relative to and independent of one another to test wear characteristics of the seat bottom surface and the seat back surface of the seat under test for a plurality of cycles; and a controller coupled to the at least one arm drive and the plurality of simulator drives and programmed with a control program to generate drive control signals so that the at least one arm drive and the plurality of simulator drives independently move the arm and the thoracic cage and femurs of the simulator, respectively, repeatedly between a withdrawn position and a plurality of seat surface engaging positions to test wear characteristics of the seat bottom surface and the seat back surface for a plurality of cycles.

4. The system of claim 3 further comprising a force measuring device coupled to the controller to generate signals indicative of forces applied to the simulator during the wear testing.

5. The system of claim 4 wherein the force measuring device is a transducer coupled to the simulator at the distal end of the arm and having six degrees of freedom.

6. The system of claim 5 wherein the transducer is a load cell.

7. A robotic human body simulator for wear testing a vehicle seat and adapted to be attached as an end effector of a robot, the simulator comprising:

a substantially geometrically-correct, relatively hard and relatively stiff skeletal frame structure including:
a thoracic cage, a pair of scapulae connected at opposite sides of the thoracic cage, a set of lumbar vertebrae connected to the thoracic cage, a pelvic girdle connected to the lumbar vertebrae, a coccyx connected to the pelvic girdle, a pair of femurs and a pair of ball-and-socket joints for connecting respective femurs to the pelvic girdle;

elastomeric plastic formed over the skeletal frame structure, the elastomeric plastic having a substantially anatomically-correct, surface geometry, and wherein at least the elastomeric plastic formed over the pelvic girdle, the coccyx and the pair of femurs has mechanical properties of bulk muscular tissue in a state of moderate contraction; and a plurality of simulator drives adapted to receive drive control signals for moving the thoracic cage and femurs relative to and independent of one another to test wear characteristics of a seat bottom surface and a seat back surface of the seat under test for a plurality of cycles.

8. The simulator as claimed in claim 7 wherein at least one of the plurality of drives moves the thoracic cage relative to and independent of the pelvic girdle.

9. The simulator as claimed in claim 8 wherein the skeletal frame structure further includes a pair of flexible couplings for allowing relative rotary and translational motion between the thoracic cage and the set of lumbar vertebrae and between the set of lumbar vertebrae and the pelvic girdle.

10. The simulator as claimed in claim 7 and wherein each of the femurs is moved by at least one of the plurality of drives relative to and independent of the pelvic girdle.

11. The simulator as claimed in claim 10 wherein each of the femurs is moved by two of the plurality of drives relative to and independent of pelvic girdle.

12. The simulator as claimed in claim 7 wherein the thoracic cage includes a set of thoracic vertebrae, a sternum and a set of ribs interconnecting the thoracic vertebrae and the sternum.

13. The simulator as claimed in claim 7 wherein each of the simulator drives includes a linear actuator and a servo motor for driving the linear actuator.

14. The simulator as claimed in claim 7 wherein the pelvic girdle includes a set of sacrum vertebrae and a pair of coxae connected to the set of sacrum vertebrae wherein the pair of ball-and-socket joints connect their respective femurs to respective coxae.

15. The simulator as claimed in claim 7 wherein the plastic formed over the pelvic girdle, the coccyx and the pair of femurs has an effective stiffness in a range of 6 to 140 kPa.

16. The simulator as claimed in claim 7 wherein the elastomeric plastic is a castable urethane elastomer molded over the skeletal frame structure.

17. The simulator as claimed in claim 7 wherein the mechanical properties include stiffness.

18. The simulator as claimed in claim 7 wherein the mechanical properties include damping.

19. The simulator as claimed in claim 7 wherein the elastomeric plastic is completely formed over the skeletal frame structure.

20. The simulator as claimed in claim 7 wherein at least a part of the skeletal frame structure is made from plastic.

* * * * *